United States Patent
Shutt et al.

(10) Patent No.: US 10,089,105 B2
(45) Date of Patent: Oct. 2, 2018

(54) SYSTEMS AND METHODS FOR BIOS UPDATE OPTIMIZATION

(71) Applicant: Dell Products L.P., Round Rock, TX (US)

(72) Inventors: Mark W. Shutt, Austin, TX (US); Wei Liu, Austin, TX (US)

(73) Assignee: Dell Products L.P., Round Rock, TX (US)

(*) Notice: Subject to any disclaimer, the term of this patent is extended or adjusted under 35 U.S.C. 154(b) by 176 days.

(21) Appl. No.: 14/949,513

(22) Filed: Nov. 23, 2015

(65) Prior Publication Data

US 2017/0147329 A1 May 25, 2017

(51) Int. Cl.
*G06F 8/654* (2018.01)
*G06F 9/445* (2018.01)

(52) U.S. Cl.
CPC .............. *G06F 8/665* (2013.01); *G06F 8/654* (2018.02)

(58) Field of Classification Search
CPC .................................. G06F 8/665; G06F 8/654
See application file for complete search history.

(56) References Cited

U.S. PATENT DOCUMENTS

| | | | | |
|---|---|---|---|---|
| 7,536,536 B1* | 5/2009 | Joshi | ........................ | G06F 8/65 713/1 |
| 2002/0194313 A1* | 12/2002 | Brannock | ................ | G06F 8/65 709/220 |
| 2006/0075276 A1* | 4/2006 | Kataria | ..................... | G06F 8/65 714/47.1 |
| 2006/0143475 A1* | 6/2006 | Herbert | ............... | H04L 63/0428 713/191 |
| 2007/0204144 A1* | 8/2007 | Gafken | ..................... | G06F 8/65 713/2 |
| 2007/0255934 A1* | 11/2007 | Dennis | ................ | G06F 11/1417 713/1 |
| 2007/0260790 A1* | 11/2007 | Chen | ......................... | G06F 8/65 710/110 |
| 2011/0167419 A1* | 7/2011 | Ishikawa | .................. | G06F 8/65 717/171 |
| 2011/0179407 A1* | 7/2011 | Minegishi | ................ | G06F 8/65 717/170 |
| 2012/0023322 A1* | 1/2012 | Landry | ..................... | G06F 8/65 713/2 |

* cited by examiner

*Primary Examiner* — Terrell S Johnson
(74) *Attorney, Agent, or Firm* — Jackson Walker L.L.P.

(57) ABSTRACT

In accordance with embodiments of the present disclosure, an information handling system may include a processor and a memory communicatively coupled to the processor, the memory having stored thereon a basic input/output system (BIOS) comprising a program of instructions executable by the processor for initializing one or more information handling resources of the information handling system during boot up or power on of the information handling system. The memory may comprise a plurality of firmware volumes comprising at least a first firmware volume having stored therein one or more components of the BIOS having a first expected update frequency and a second firmware volume having stored therein one or more components of the BIOS having a second expected update frequency less than that of the first expected update frequency.

18 Claims, 2 Drawing Sheets

SYSTEMS AND METHODS FOR BIOS UPDATE OPTIMIZATION

TECHNICAL FIELD

The present disclosure relates in general to information handling systems, and more particularly to systems and methods for optimizing updates of a basic input/output system embodied in memory of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A key component of almost every information handling system is the basic input/output system (BIOS). A BIOS may be a system, device, or apparatus configured to identify, test, and/or initialize one or more information handling resources of an information handling system, typically during boot up or power on of an information handling system. A BIOS may include boot firmware configured to be the first code executed by a processor of an information handling system when the information handling system is booted and/or powered on. As part of its initialization functionality, BIOS code may be configured to set components of the information handling system into a known state, so that one or more applications (e.g., an operating system or other application programs) stored on compatible media may be executed by a processor and given control of the information handling system and its various components.

Typically, a BIOS is stored in a memory, such as a serial peripheral interface (SPI) flash memory. From time to time, portions of executable code in a BIOS may be updated. Often when a new BIOS version is released, a relatively small portion of the BIOS is actually changed. However, because much of the BIOS code is compressed and packed into a small number of firmware volumes in the BIOS memory, small changes may cause much of the BIOS memory contents to change, causing much of the BIOS memory to be erased and reprogrammed during a BIOS update. As BIOS memory sizes increase, BIOS update times may also increase.

SUMMARY

In accordance with the teachings of the present disclosure, the disadvantages and problems associated with existing approaches to updating a BIOS may be reduced or eliminated.

In accordance with embodiments of the present disclosure, an information handling system may include a processor and a memory communicatively coupled to the processor, the memory having stored thereon a basic input/output system (BIOS) comprising a program of instructions executable by the processor for initializing one or more information handling resources of the information handling system during boot up or power on of the information handling system. The memory may comprise a plurality of firmware volumes comprising at least a first firmware volume having stored therein one or more components of the BIOS having a first expected update frequency and a second firmware volume having stored therein one or more components of the BIOS having a second expected update frequency less than that of the first expected update frequency.

In accordance with these and other embodiments of the present disclosure, a method may include, during a build process of a basic input/output system (BIOS) comprising a program of instructions executable by a processor for initializing one or more information handling resources of an information handling system during boot up or power on of the information handling system, classifying components of the BIOS into two or more categories according to an expected update frequency for each component, allocating to a first firmware volume one or more components of the BIOS having a first expected update frequency, allocating to a second firmware volume one or more components of the BIOS having a second expected update frequency less than that of the first expected update frequency, and building the BIOS to a memory comprising the first firmware volume and the second firmware volume according to allocations to the first firmware volume and the second firmware volume.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to, during a build process of a basic input/output system (BIOS) comprising a program of instructions executable by a processor for initializing one or more information handling resources of an information handling system during boot up or power on of the information handling system: (i) classify components of the BIOS into two or more categories according to an expected update frequency for each component; (ii) allocate to a first firmware volume one or more components of the BIOS having a first expected update frequency; (iii) allocate to a second firmware volume one or more components of the BIOS having a second expected update frequency less than that of the first expected update frequency; and (iv) build the BIOS to a memory comprising the first firmware volume and the second firmware volume according to allocations to the first firmware volume and the second firmware volume.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
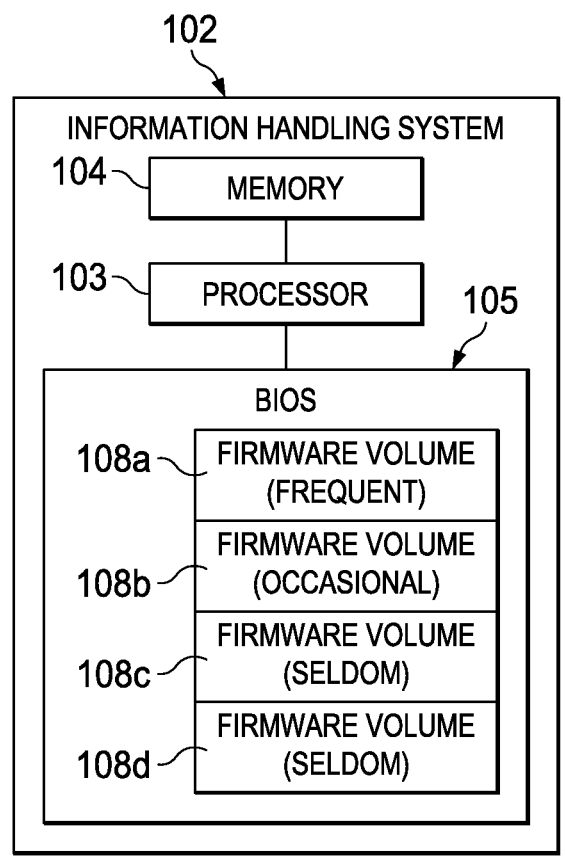
FIG. 1 illustrates a block diagram of an example information handling system, in accordance with embodiments of the present disclosure.
Figure 2:
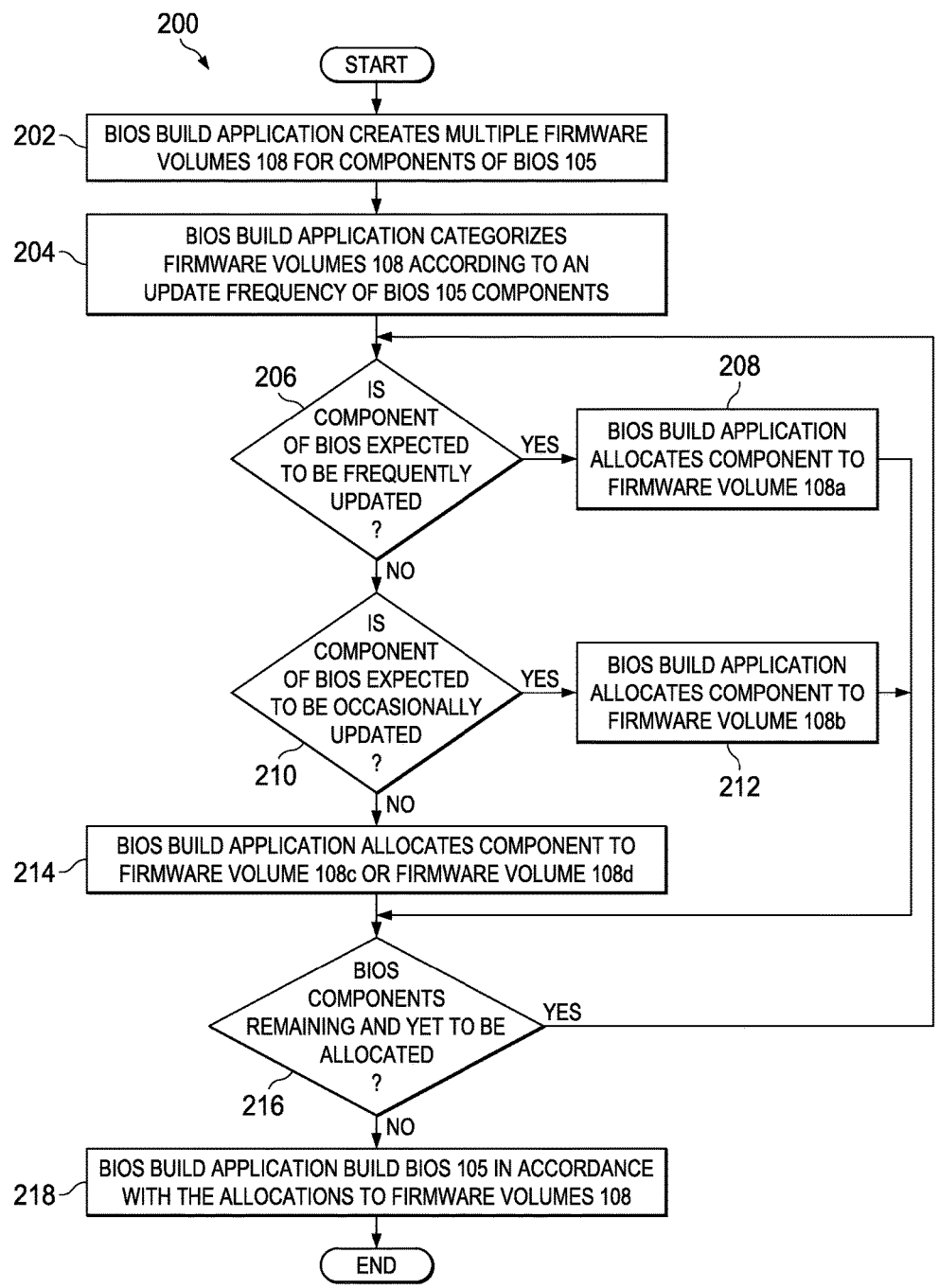
FIG. 2 illustrates a flow chart of an example method for building a BIOS, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

FIG. 1 illustrates a block diagram of an example of an information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, and a basic input/output system (BIOS) 105 communicatively coupled to processor 103, a management controller 106 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

BIOS 105 may be embodied in its own dedicated memory accessible to processor 103. For example, in some embodiments, BIOS 105 may be embodied in a serial peripheral interface (SPI) flash memory. As shown in FIG. 1, BIOS 105 may be segmented into a plurality of firmware volumes 108 (e.g., firmware volumes 108a, 108b, 108c, and 108d). During a build process for BIOS 105, the various components (e.g., drivers) of BIOS 105 may each be classified into two or more categories based on how frequently each component is updated or expected to be updated. For example, frequently-updated components may be classified into a first category, occasionally-updated components (e.g., updated less frequently than those in the first category) may be classified into a second category, and seldomly-updated components (e.g., updated less frequently than those in the second category) may be classified into a third category.

After such classification, components of each category may be placed in respective firmware volumes 108 stored within the memory of BIOS 105. For example, components in the first category may be placed in firmware volume 108a, components in the second category may be placed in firmware volume 108b, and components in the third category may be placed in firmware volumes 108c and 108d.

After the initial build of BIOS 105 into multiple firmware volumes 108, most updates to BIOS 105 would be expected to have updates within firmware volume 108a. In the event of an update affecting only those components stored in firmware volume 108a, only those sectors of BIOS memory in firmware volume 108a would need to be erased and reprogrammed, instead of employing a traditional approach in which an entire BIOS embodied in a single firmware volume is erased and reprogrammed in order to effect the update. Similarly, in the event of an update affecting only those components stored in firmware volume 108b, only those sectors of BIOS memory in firmware volume 108b would need to be erased and reprogrammed.

In the event that, during build, one of the categories has a large number of components, components of such category may be separated into two or more firmware volumes. For example, as shown in FIG. 1, the seldomly-updated components may be separated into two firmware volumes 108c and 108d. Thus, if one of the components in the third category requires update, only those sectors of one of firmware volumes 108c and 108d would need to be erased and reprogrammed, rather than both.

In addition to the methods and systems described above, additional techniques may be employed to reduce the likelihood of a change to one firmware volume 108 affecting another. For example, in some embodiments, when building BIOS 105, one or more firmware volumes 108 may include empty space or "padding" near the end of a firmware volume 108, reducing the likelihood that an increase in contents of such firmware volume 108 will cause such firmware volume to creep into an adjacent firmware volume. As another example, in these and other embodiments, when building BIOS 105, one or more portions including empty sectors may be reserved between firmware volumes 108.

In addition to processor 103, memory 104, and BIOS 105, information handling system 102 may include one or more other information handling resources. Furthermore, although FIG. 1 depicts BIOS 105 having four firmware volumes 108, a BIOS 105 may include any suitable number (e.g., two or more) of firmware volumes. Moreover, although FIG. 1 depicts two firmware volumes 108c and 108d for the third seldomly-used category, in some embodiments, components in another component category (e.g., frequently-updated and occasionally-updated) may be stored in two or more firmware volumes 108.

FIG. 2 illustrates a flow chart of an example method 200 for building a BIOS, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a BIOS build application (e.g., a program of instructions executing on a processor of an information handling system), may create multiple firmware volumes 108 for components of BIOS 105. For example, the BIOS build application may configure a flash description file or similar data structure for information handling system 102 to have multiple firmware volumes for Driver Execution (DXE) sections, Pre-Extensible Firmware Interface (EFI) Initialization (PEI) sections, and/or other components of BIOS 105.

At step 204, the BIOS build application may categorize firmware volumes 108 according to an update frequency of BIOS 105 components. For example, firmware volume 108a may be categorized to store frequently-updated components, firmware volume 108b may be categorized to store occasionally-updated components, and firmware volumes 108c and 108d may be categorized to store seldomly-updated components.

At step 206, the BIOS build application may determine if a component of BIOS 105 is expected to be frequently updated. If the component is expected to be frequently updated, method 200 may proceed to step 208. Otherwise, method may proceed to step 210.

At step 208, in response to the BIOS component expected to be frequently updated, the BIOS build application may allocate the component to firmware volume 108a. After completion of step 208, method 200 may proceed to step 216.

At step 210, in response to the BIOS component expected to not be frequently updated, the BIOS build application may determine if the component of BIOS 105 is expected to be less frequently, but occasionally updated. If the component is expected to be occasionally updated, method 200 may proceed to step 212. Otherwise, method 200 may proceed to step 214.

At step 212, in response to the BIOS component expected to be occasionally updated, the BIOS build application may allocate the component to firmware volume 108b. After completion of step 212, method 200 may proceed to step 216.

At step 214, in response to the BIOS component expected to not be frequently or occasionally updated (meaning the component may be expected to only be seldomly-updated) the BIOS build application may allocate the component to firmware volume 108c or firmware volume 108d.

At step 216, the BIOS build application may determine if any BIOS components are remaining and yet to be allocated to a respective firmware volume 108. If one or more BIOS components remain to be allocated, method 200 may proceed again to step 206, and steps 206-216 may repeat for each component of BIOS 105. In no BIOS components remain to be allocated to firmware volumes 108, method 200 may continue to step 218.

At step 218, the BIOS build application may build BIOS 105 in accordance with the allocations to firmware volumes 108 made in the foregoing steps. After completion of step 218, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using any other system operable to implement method 200 (e.g., an information handling system similar to that depicted in FIG. 1). In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a memory communicatively coupled to the processor, the memory having stored thereon a basic input/output system (BIOS) comprising a program of instructions executable by the processor for initializing one or more information handling resources of the information handling system during boot up or power on of the information handling system, wherein the memory comprises a plurality of firmware volumes comprising at least:
      a first firmware volume having stored therein one or more components of the BIOS having a first expected update frequency, wherein the first firmware volume is updateable; and
      a second firmware volume having stored therein one or more components of the BIOS having a second expected update frequency less than that of the first expected update frequency, wherein the second firmware volume is updateable;
   wherein the BIOS is updateable via a BIOS update procedure that overwrites the first firmware volume but does not overwrite the second firmware volume.

2. The information handling system of claim 1, wherein the plurality of firmware volumes also comprises at least a third firmware volume having stored therein one or more components of the BIOS having a third expected update frequency less than that of the second expected update frequency.

3. The information handling system of claim 1, wherein the plurality of firmware volumes also comprises at least a third firmware volume having stored therein one or more additional components of the BIOS having the first expected update frequency.

4. The information handling system of claim 1, wherein the plurality of firmware volumes also comprises at least a third firmware volume having stored therein one or more additional components of the BIOS having the second expected update frequency.

5. The information handling system of claim 1, wherein during an update of the BIOS, only one of the first firmware volume and the second firmware volume is configured to be erased and reprogrammed to complete the update.

6. The information handling system of claim 1, wherein the memory comprises a serial peripheral interface flash memory.

7. A method comprising, during a build process of a basic input/output system (BIOS) comprising a program of instructions executable by a processor for initializing one or more information handling resources of an information handling system during boot up or power on of the information handling system:
   classifying components of the BIOS into two or more categories according to an expected update frequency for each component;
   allocating to a first firmware volume one or more components of the BIOS having a first expected update frequency;
   allocating to a second firmware volume one or more components of the BIOS having a second expected update frequency less than that of the first expected update frequency; and
   building the BIOS to a memory comprising the first firmware volume and the second firmware volume according to allocations to the first firmware volume and the second firmware volume.

8. The method of claim 7, further comprising:
   allocating to a third firmware volume one or more components of the BIOS having a third expected update frequency less than that of the second expected update frequency; and
   building the BIOS to the memory comprising the first firmware volume, the second firmware volume, and the third firmware volume according to allocations to the first firmware volume, the second firmware volume, and the third firmware volume.

9. The method of claim 7, further comprising:
   allocating to a third firmware volume one or more additional components of the BIOS having the first expected update frequency; and
   building the BIOS to the memory comprising the first firmware volume, the second firmware volume, and the third firmware volume according to allocations to the first firmware volume, the second firmware volume, and the third firmware volume.

10. The method of claim 7, further comprising:
    allocating to a third firmware volume one or more additional components of the BIOS having the second expected update frequency; and
    building the BIOS to the memory comprising the first firmware volume, the second firmware volume, and the third firmware volume according to allocations to the first firmware volume, the second firmware volume, and the third firmware volume.

11. The method of claim 7, wherein during an update of the BIOS, only one of the first firmware volume and the second firmware volume is erased and reprogrammed to complete the update.

12. The method of claim 7, wherein the memory comprises a serial peripheral interface flash memory.

13. An article of manufacture comprising:
a non-transitory computer-readable medium; and
computer-executable instructions carried on the computer-readable medium, the instructions readable by a processor, the instructions, when read and executed, for causing the processor to, during a build process of a basic input/output system (BIOS) comprising a program of instructions executable for initializing one or more information handling resources of an information handling system during boot up or power on of the information handling system:
classify components of the BIOS into two or more categories according to an expected update frequency for each component;
allocate to a first firmware volume one or more components of the BIOS having a first expected update frequency;
allocate to a second firmware volume one or more components of the BIOS having a second expected update frequency less than that of the first expected update frequency; and
build the BIOS to a memory comprising the first firmware volume and the second firmware volume according to allocations to the first firmware volume and the second firmware volume.

14. The article of claim 13, the instructions for further causing the processor to:
allocate to a third firmware volume one or more components of the BIOS having a third expected update frequency less than that of the second expected update frequency; and
build the BIOS to the memory comprising the first firmware volume, the second firmware volume, and the third firmware volume according to allocations to the first firmware volume, the second firmware volume, and the third firmware volume.

15. The article of claim 13, the instructions for further causing the processor to:
allocate to a third firmware volume one or more additional components of the BIOS having the first expected update frequency; and
build the BIOS to the memory comprising the first firmware volume, the second firmware volume, and the third firmware volume according to allocations to the first firmware volume, the second firmware volume, and the third firmware volume.

16. The article of claim 13, the instructions for further causing the processor to:
allocate to a third firmware volume one or more additional components of the BIOS having the second expected update frequency; and
build the BIOS to the memory comprising the first firmware volume, the second firmware volume, and the third firmware volume according to allocations to the first firmware volume, the second firmware volume, and the third firmware volume.

17. The article of claim 13, wherein during an update of the BIOS, only one of the first firmware volume and the second firmware volume is configured to be erased and reprogrammed to complete the update.

18. The article of claim 13, wherein the memory comprises a serial peripheral interface flash memory.

* * * * *